(12) United States Patent
Mains, Jr.

(10) Patent No.: US 11,625,664 B2
(45) Date of Patent: Apr. 11, 2023

(54) APPARATUS AND METHOD FOR FREIGHT DELIVERY AND PICK-UP

(71) Applicant: CRC R&D, LLC, Kenner, LA (US)

(72) Inventor: Ronald H. Mains, Jr., Kenner, LA (US)

(73) Assignee: CRC R&D, LLC, Kenner, LA (US)

(*) Notice: Subject to any disclaimer, the term of this patent is extended or adjusted under 35 U.S.C. 154(b) by 449 days.

(21) Appl. No.: 14/506,545

(22) Filed: Oct. 3, 2014

(65) Prior Publication Data

US 2015/0081582 A1 Mar. 19, 2015
US 2016/0012385 A9 Jan. 14, 2016

Related U.S. Application Data

(60) Provisional application No. 61/886,447, filed on Oct. 3, 2013.

(51) Int. Cl.
*G06Q 10/08* (2012.01)
*G06Q 10/083* (2023.01)

(52) U.S. Cl.
CPC .................. *G06Q 10/083* (2013.01)

(58) Field of Classification Search
CPC .................. G06Q 10/083
See application file for complete search history.

(56) References Cited

U.S. PATENT DOCUMENTS

| | | | |
|---|---|---|---|
| 6,611,755 B1 * | 8/2003 | Coffee | H04W 56/0085 455/526 |
| 9,911,084 B2 | 3/2018 | Bryson | |
| 10,127,556 B2 * | 11/2018 | Lesesky | G06Q 20/405 |
| 10,242,273 B1 * | 3/2019 | Eckman | G06Q 50/28 |
| 10,293,842 B2 * | 5/2019 | Miyajima | B60L 3/106 |
| 10,388,162 B2 | 8/2019 | De Moura | |
| 10,706,322 B1 | 7/2020 | Yang | |
| 10,769,947 B2 | 9/2020 | De Moura | |
| 10,990,109 B2 | 4/2021 | Nelson | |
| 2002/0059075 A1 * | 5/2002 | Schick | G06Q 10/06 705/305 |

(Continued)

FOREIGN PATENT DOCUMENTS

WO WO-2006124105 A2 * 11/2006 .............. B60P 3/03

OTHER PUBLICATIONS

ITS International, Savings accrue from on-line form truck screening, Dec. 8, 2013 https://web.archive.org/web/20131208174419/https://www.itsinternational.com/sections/cost-benefit-analysis/features/savings-accrue-from-on-line-from-truck-screening/ (Year: 2013).*

(Continued)

*Primary Examiner* — Omar Zeroual
(74) *Attorney, Agent, or Firm* — Jason P. Mueller; FisherBroyles, LLP

(57) ABSTRACT

An exemplary nonlimiting embodiment of the present invention provides a system that includes a loading/unloading facility, a user apparatus having a user interface configured to communicate with a driver of a delivery/pick-up vehicle, and an administrator apparatus configured to communicate with the user apparatus and the loading/unloading facility. The user apparatus is located remotely from the loading/unloading facility. The driver checks into the user apparatus and the administrator apparatus coordinates arrival of the delivery/pick-up vehicle at the loading/unloading facility.

24 Claims, 9 Drawing Sheets

(56) References Cited

U.S. PATENT DOCUMENTS

| | | | |
|---|---|---|---|
| 2002/0138580 A1* | 9/2002 | Al-Kazily | H04L 67/52 709/206 |
| 2003/0132298 A1* | 7/2003 | Swartz | G06K 17/00 235/472.02 |
| 2004/0260470 A1* | 12/2004 | Rast | G06Q 10/0637 705/337 |
| 2005/0046584 A1* | 3/2005 | Breed | B60R 21/01536 340/13.31 |
| 2005/0128059 A1* | 6/2005 | Vause | B60D 1/36 340/686.2 |
| 2005/0174258 A1* | 8/2005 | Yamanouchi | G07C 9/00 340/928 |
| 2006/0095331 A1* | 5/2006 | O'Malley | G06F 17/30902 705/22 |
| 2006/0208169 A1* | 9/2006 | Breed | B60N 2/002 250/221 |
| 2006/0219776 A1* | 10/2006 | Finn | B60R 25/25 235/380 |
| 2006/0235739 A1* | 10/2006 | Levis | G06Q 10/08 705/1.1 |
| 2006/0251498 A1* | 11/2006 | Buzzoni | B66C 13/48 414/139.9 |
| 2007/0038353 A1 | 2/2007 | Larschan | |
| 2007/0083600 A1* | 4/2007 | Bakos | H04L 51/38 709/206 |
| 2007/0193834 A1* | 8/2007 | Pai | G06Q 10/08 186/3 |
| 2008/0055263 A1* | 3/2008 | Lemay | H04M 1/72522 345/173 |
| 2009/0045924 A1* | 2/2009 | Roberts, Sr. | G08G 1/20 340/10.41 |
| 2010/0069035 A1* | 3/2010 | Johnson | G06Q 30/0633 455/566 |
| 2010/0088127 A1* | 4/2010 | Betancourt | G06Q 10/02 705/26.1 |
| 2010/0104392 A1* | 4/2010 | Bowen | B60P 3/08 410/26 |
| 2010/0157061 A1* | 6/2010 | Katsman | G07C 5/008 348/149 |
| 2011/0153190 A1* | 6/2011 | Rolinski | G01C 21/367 701/533 |
| 2011/0313893 A1* | 12/2011 | Weik, III | B60R 25/00 705/28 |
| 2012/0002045 A1 | 1/2012 | Tony | |
| 2012/0126939 A1* | 5/2012 | Chang | G07C 9/00563 340/5.53 |
| 2012/0146763 A1* | 6/2012 | Teti | G07C 9/00158 340/5.7 |
| 2012/0190386 A1* | 7/2012 | Anderson | G01C 15/04 455/456.3 |
| 2012/0191272 A1 | 7/2012 | Andersen | |
| 2012/0246039 A1* | 9/2012 | Fain | G06Q 10/08 705/341 |
| 2013/0173287 A1* | 7/2013 | Cashman | E04H 3/08 705/2 |
| 2013/0226632 A1* | 8/2013 | Gilbert | B64F 1/366 705/5 |
| 2014/0006302 A1* | 1/2014 | McQuillan | G07C 9/00142 705/337 |
| 2014/0035723 A1* | 2/2014 | Alfar | G05B 1/01 340/5.65 |
| 2014/0052327 A1 | 2/2014 | Hosein et al. | |
| 2014/0074257 A1 | 3/2014 | Bhargava | |
| 2014/0095240 A1* | 4/2014 | White | G06Q 10/08 705/7.15 |
| 2014/0114718 A1* | 4/2014 | Randall | G06Q 10/08 705/7.23 |
| 2014/0156524 A1* | 6/2014 | Ruud | G06Q 20/3224 705/42 |
| 2014/0279294 A1* | 9/2014 | Field-Darragh | G06Q 10/087 705/28 |
| 2014/0306833 A1 | 10/2014 | Ricci | |
| 2014/0309789 A1 | 10/2014 | Ricci | |
| 2015/0006430 A1* | 1/2015 | Ben-Alexander | G06Q 10/0631 705/337 |
| 2015/0294431 A1* | 10/2015 | Fiorucci | G06Q 50/26 705/13 |
| 2015/0356481 A1* | 12/2015 | Mains | G06Q 10/06311 705/7.13 |
| 2016/0086391 A1* | 3/2016 | Ricci | G07C 5/008 701/29.3 |
| 2016/0171328 A1 | 6/2016 | Bulan et al. | |
| 2016/0171521 A1* | 6/2016 | Ramirez | B60K 35/00 701/409 |
| 2017/0043967 A1* | 2/2017 | Walford | B65G 69/003 |
| 2018/0211534 A1 | 7/2018 | De Moura | |
| 2018/0268379 A1 | 9/2018 | Collins | |
| 2018/0305876 A1 | 10/2018 | Langford | |
| 2019/0035274 A1 | 1/2019 | Sabagh | |
| 2019/0066033 A1* | 2/2019 | Mains, Jr. | G06Q 10/06311 |
| 2019/0286143 A1 | 9/2019 | Ross | |

OTHER PUBLICATIONS

"Big Bend Travel Plaza: Driver Services", published by wwww.bigbendtravelplaza.com on Jan. 8, 2011 (Year: 2011).*

"Hotel internet services", published by www.hotelwifi.com, in 2012 (Year: 2012).*

ITS international "Savings accrue form on-line from truck screening" dated Dec. 8, 2013, all pages (Year: 2013).*

Smart Card Alliance, "authentication mechanisms for physical access control", published by Smart Card Alliance on Oct. 2009, all pages. (Year: 2009).*

Theodore Kuklinski, "The Use of ID reader-Authentication Secure Access control and credentialing", published by IEEE in 2009, all pages (Year: 2009).*

Nicola Zingirian, Sensor Clouds for intelligent Truck Monitoring, Jun. 3-7, 2012, In telligent Vehicles Symposium, 999-1004 (Year: 2012).

USPS Yard Management System—VOA Manual WhereNet, Accenture, Apr. 23, 2012 (Year 2012).

C3 Yard datasheet C3 Solutions, Inc., 2016 (Year 2016).

C3 Solutions Case Study—UK Parcel Delivery Company C3 Solutions, Inc. 2016 (Year 2016).

The Synchronized Distribution Supply Chain—Best Practices in Yard Management Motorola, 2013 (Year: 2013).

Yard Smart—datasheet C3 Solutions Inc., 2013 (Year: 2013).

4SIGHT helps facilities capitalize on productivity using real-time data Plant Engineering, Jan. 18, 2011 (Year: 2011).

Braun, Gregory, A Practical Guide—Everything you need to know about buying a Dock Appointment Scheduling System C3 Solutions, May 2017 (Year: 2017).

Bulan et al., "Segmentation- and Annotation-Free License Plate Recognition With Deep Localization and Failure dentification", IEEE Transactions on Intelligent Transportation Systems, vol. 18, No. 9, pp. 2351-2363, Sep. 1, 2017 (Sep. 1, 2017).

* cited by examiner

Cross Road Centers

For assistance call 1-800-800-1142

APPARATUS AND METHOD FOR FREIGHT DELIVERY AND PICK-UP

CROSS-REFERENCE TO RELATED APPLICATIONS

This application claims the benefit of U.S. Provisional Patent Application No. 61/886,447 filed on Oct. 3, 2013, the entire contents of which are incorporated herein by reference.

FIELD

The present invention relates to freight delivery/pick-up systems, and in particular, though non-limiting embodiments, to apparatuses, systems and methods for management of freight vehicles from remote locations.

BACKGROUND

A constant challenge for an entity operating a warehouse, or other delivery and/or pick-up facility, is to efficiently, safely and securely provide for the delivery and pick-up of goods. "Pick-ups" typically involve bringing a freight vehicle to a warehouse loading bay for loading cargo. "Deliveries" typically involve bringing a loaded freight vehicle to a warehouse loading bay for unloading cargo. Freight vehicles are often relatively large tractor/trailers that require ample space and pick-ups/deliveries are often scheduled for a fixed fifteen to thirty minute window. Theoretically, during the scheduled window, the inbound freight vehicle, e.g., tractor/trailer, arrives, reports to the guard shack or receiving window, is assigned a loading bay, and then proceeds to the loading bay for loading and/or unloading by warehouse personnel. In certain situations drivers drive directly to the warehouse or loading bay. Often no prescreening is done to ensure authorization of the driver and load prior to arrival at the warehouse site, loading bay, guard shack or receiving window.

Furthermore, because travel from a previous destination may involve a journey of hundreds or thousands of miles, it is not uncommon for there to be an early or late arrival at the warehouse. An early or late arriving tractor/trailer may have to wait for many minutes or several hours until its previously scheduled or next available pick-up/delivery window. Scheduling delays may also occur for other reasons, including delays related to warehouse operations, weather, etc. Many facilities, due to high volumes of deliveries and/or limited space availability, frequently experience bottlenecks that result in many logistics issues. Few facilities have sufficient on-site parking available. It is not uncommon for there to be long lines of tractor/trailers either on-site or at the side of a nearby highway or street awaiting the opportunity to pick-up or drop-off cargo. These situations are potentially dangerous, often illegal and cause problems for other vehicles, businesses and residents in the area.

SUMMARY

An exemplary embodiment of the present invention provides a system that includes a loading/unloading facility, a user apparatus having a user interface configured to communicate with a driver of a delivery/pick-up vehicle, and an administrator apparatus configured to communicate with the user apparatus and the loading/unloading facility. The user apparatus is located remotely from the loading/unloading facility and the driver checks into the user apparatus. The administrator apparatus coordinates arrival of the delivery/pick-up vehicle at the loading/unloading facility.

DESCRIPTION

The present disclosure provides apparatuses, systems and methods for remote or off-site check-in of freight vehicles that eliminate many of the problems with current freight delivery and pick-up. Embodiments include custom apparatuses and software that interface as a system to remotely control the logistics of delivery and pick-up of freight thereby providing for a more efficient, safe and secure use of loading bays and personnel resources. In a specific embodiment, the system provides a simple remote touch screen interface that allows drivers of freight vehicles to remotely login to the freight management system, become authorized, and coordinate, through the system, efficient delivery and/or pick-up of freight. The check-in service may be full service and efficiently coordinate, by providing all necessary information, for safe delivery of goods. The remote login/user interface may be located separate from the loading/unloading facility and possibly may be remotely located from an administrator system. The administrator system communicates with the driver/remote user apparatus as well as the loading/unloading facility and coordinates and controls the logistics of the delivery/pick-up. Some or all of this process is automated by the system apparatuses and software. The remote user interface may be located at an off-site driver's lounge that is relatively near the loading/unloading facility. This remote location may be designed to accommodate freight vehicles and personnel, including providing adequate parking and other amenities. In certain embodiments, the driver is provided a pager which is used to alert him a few minutes before a loading bay is available. While he waits, the driver may utilize facilities for refueling, showering, restaurant, rest and relaxation. The present system avoids potentially dangerous situations where trucks are parked in queues along highways and residential streets.

Figure 1:
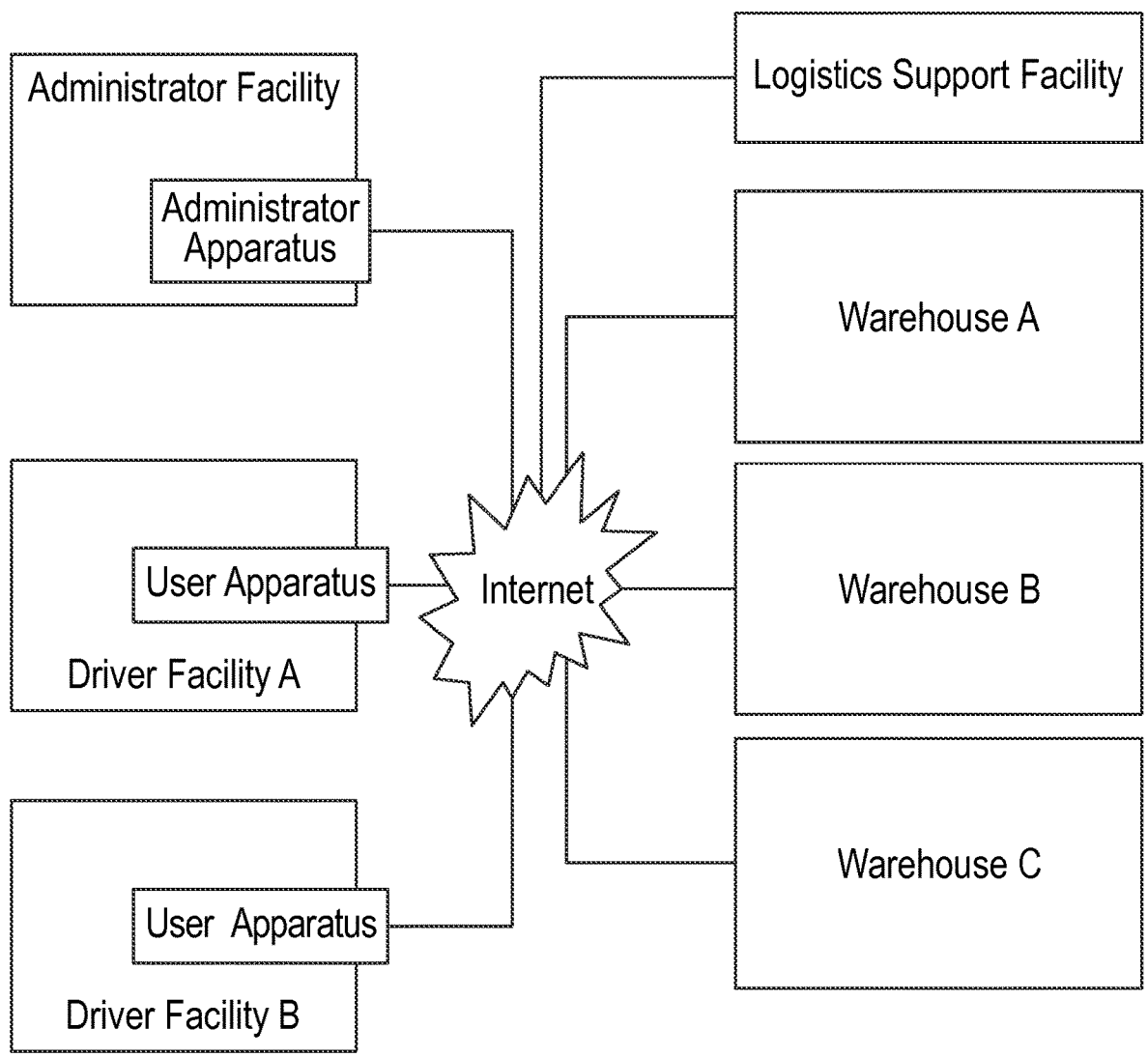
FIG. 1 is a schematic of a freight delivery/pick-up system, according to an exemplary embodiment of the present invention.

FIG. 1 schematically depicts a freight delivery/pick-up system, according to an exemplary embodiment of the present invention. The overall system includes a driver facility, an administrative facility and a warehouse. As shown in FIG. 1 there are two driver facilities and three warehouse facilities. There may be more or less of each of these facilities. Each driver facility includes a user apparatus. The administrator facility includes an administrator apparatus. The warehouses include unloading/loading facilities such as loading docks. The driver facility is remotely located from the warehouses. The administrative facility may or may not be separately located from the driver facility. The user apparatuses, administrator apparatus and warehouses are all in communication via the Internet. They may, however, be in communication via other communication networks, e.g., a LAN. The administrator system communicates with the driver/remote user apparatus as well as the loading/unloading facility and coordinates and controls the logistics of the delivery/pick-up. Some or all of this process is automated by the system apparatuses and software as described herein. According to an embodiment of the present invention, a driver of a freight vehicle, e.g., delivery/pick-up vehicle, positions himself at a location distant, e.g. driver facility A, B, from the loading/unloading facility. The driver approaches and communicates with a user interface of a user apparatus. The user apparatus and an administrator apparatus then work together to coordinate the arrival of the delivery/pick-up vehicle at the loading/unloading facility, e.g. warehouse A, B, C. In further embodiments, the system may include a logistics support facility to further aid in the coordination of arrival of the delivery/pick-up vehicle at the loading/unloading facility. The logistics support facility maybe a warehouse or other storage facility or area configured for storing freight until it ready to be delivered to a final destination such as a specific designated loading/unloading bay. As shown in FIG. 1, the logistics support facility may be in communication with the administrator apparatus, user apparatus and/or loading/unloading facility via the Internet or other suitable network. It may also be tied into a server for the administrator apparatus, user apparatus and/or loading/unloading facility. The system may also include an off-site certified scale system that is in communication with the administrator apparatus, user apparatus and/or loading/unloading facility via the Internet or other suitable network. The scale system may be located in a convenient location such as proximate to the user apparatus and/or driver facility. Alternatively it may be located at a more remote location.

The loading/unloading facility of the present disclosure can take many forms. In many instances the loading/unloading facility will be a warehouse with multiple loading docks for delivery/pick-up vehicles. However, in other cases the loading/unloading facility could involve ships, train yards, commercial stores, fields or any other structure where efficient scheduling of multiple delivery/pick-up vehicles is advantageous.

Embodiments of the present invention include a check-in driver facility that is remote from or distant from a loading/unloading facility. The check-in driver facility includes a user apparatus that the driver of a freight vehicle checks into and interfaces with the freight management system described herein.

Figure 2:
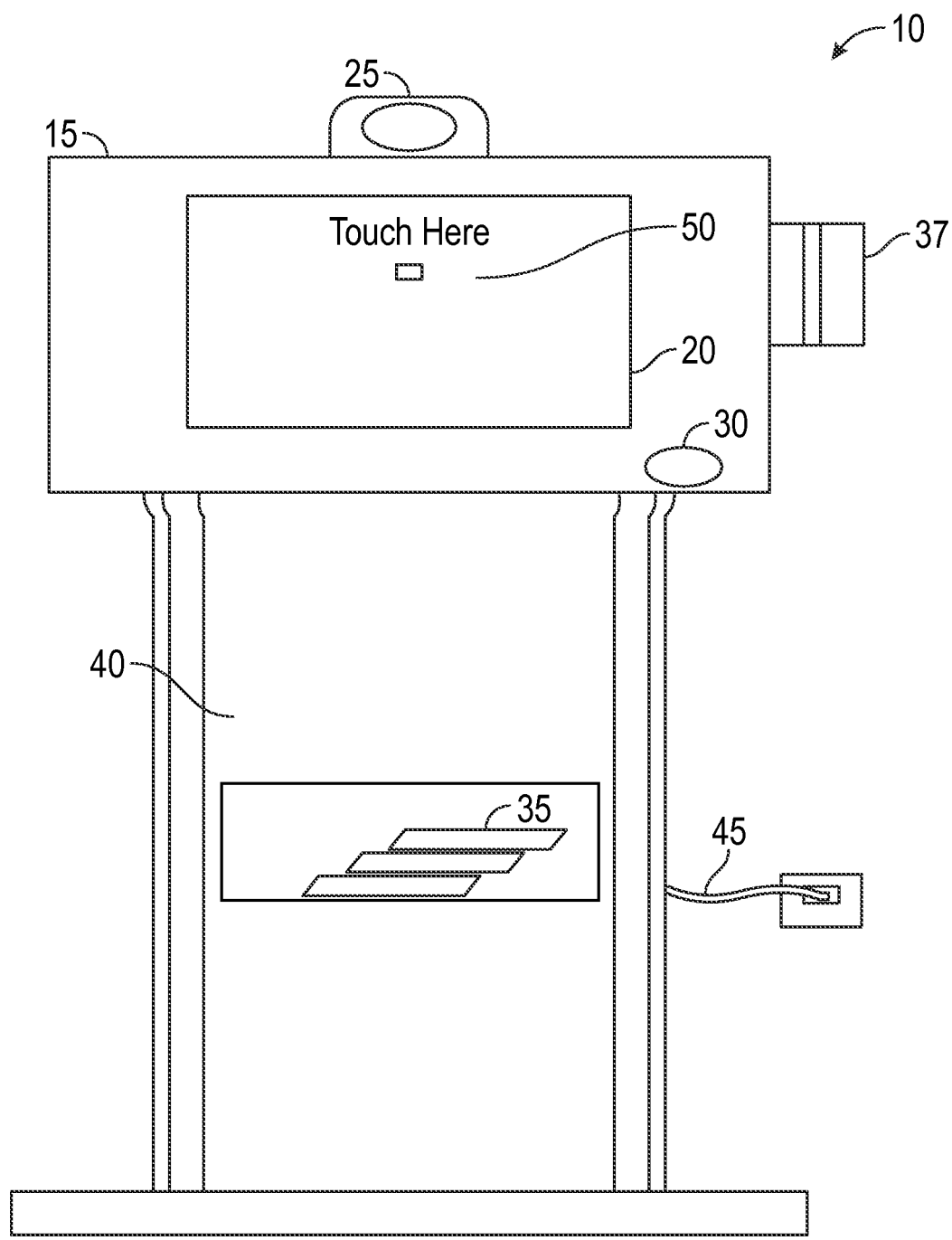
FIG. 2 shows a user apparatus, according to an exemplary embodiment of the present invention.
Figure 3:
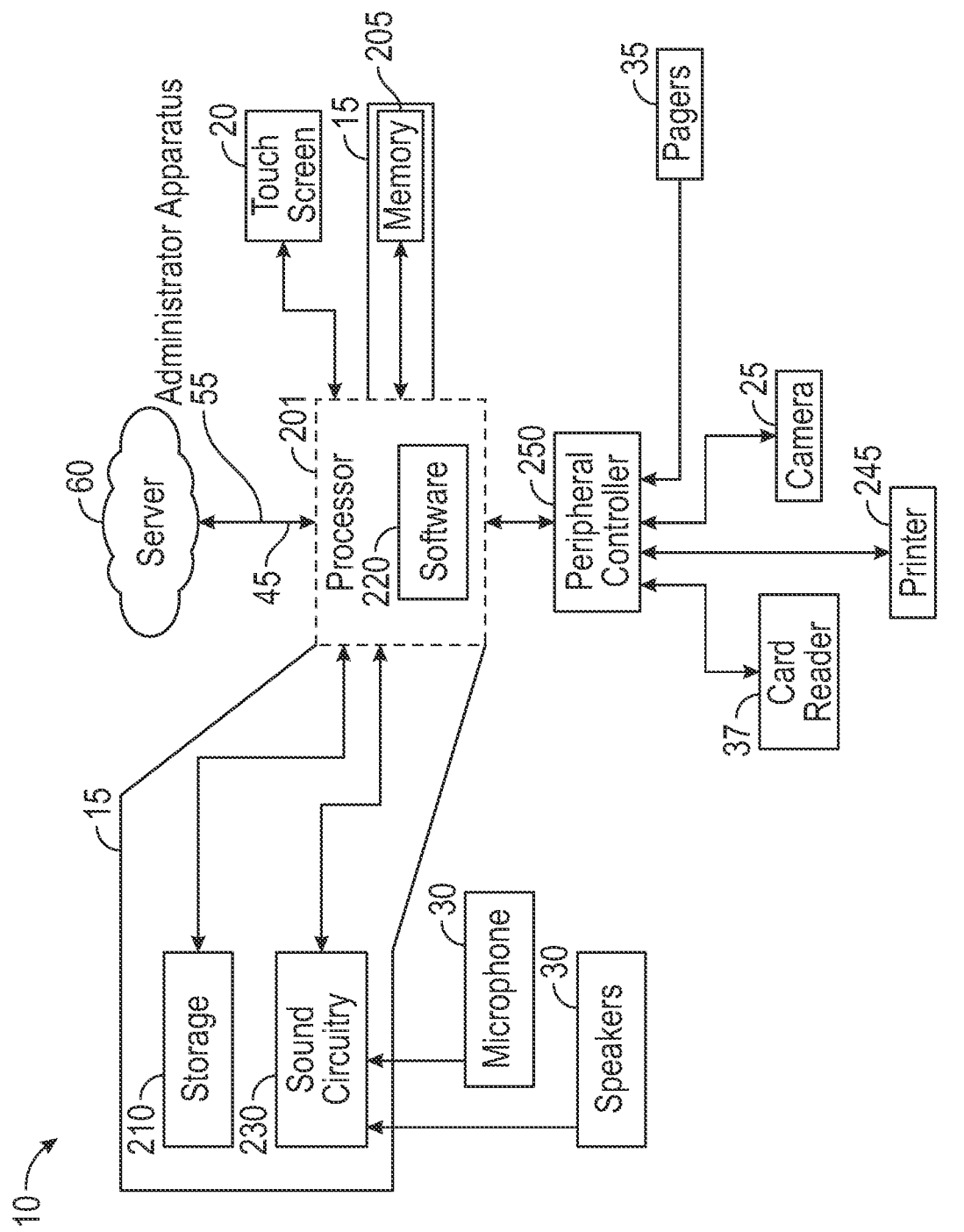
FIG. 3 is a schematic of the user apparatus shown in FIG. 1.
Figure 4:
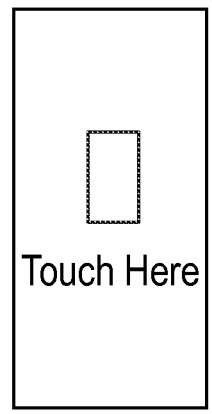
FIG. 4 is a screen view of a user interface of the user apparatus shown in FIG. 2.
Figure 4:
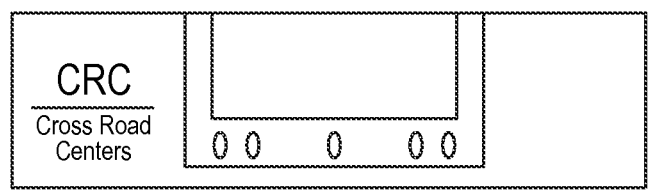
Figure 5:
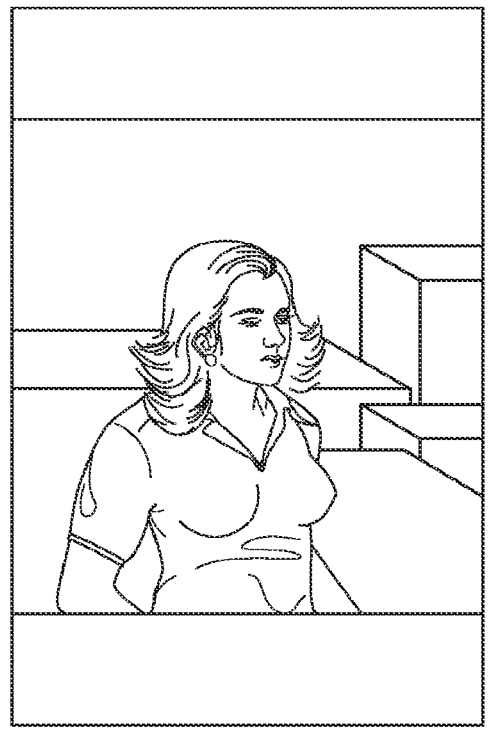
FIG. 5 is a view of a video call as seen from the user interface shown in FIG. 4.

FIG. 2 shows an example embodiment of a user apparatus. The user apparatus (10) may be similar in size and shape to a vending machine, or, in other variations, may be configured as a wall mounted display. User interface (50) provides for entry and receipt of freight driver information and may be implemented via computer (15), touch screen monitor (20), microphone and speaker (30), as well as a stand (40). The touch screen monitor (20) serves as a communication link between the driver and an administrative system. An exemplary user interface screen (50) is shown in FIG. 4. The user interface is in communication with the administrator apparatus and/or loading/unloading facility and can obtain information from and communicate information to the driver such as check-in time, assigned loading dock, pick-up/drop-off time, authorization information, driver identifying information, truck and trailer number, scale in/weight documentation, authorized driver release, instructions, etc. In embodiments of the present invention the user apparatus may be configured to communicate and/or receive this information digitally, visually, audibly, through voice recognition, through scanning devices, or any combination thereof. In one embodiment the driver simply pushes a single button and is connected to a live administrative representative that instructs the driver what he needs to do and enters information into the system for communication with various components of the system. In another embodiment the driver interface with an automated administrator apparatus and information may be gathered via voice recognition technologies operable on computer (15) and in communication with the system via a communications network. Computer as used herein, is intended to encompass any suitable processing device. Indeed the computer may be adapted to execute any operating system including Linux™, UNIX™, Windows™, or any other suitable operating system. In some embodiments the computer is monolithic with the touch screen, e.g. an HP ENVY Touchsmart™ all-in-one PC. As shown in FIG. 3, the computer (15) may be implemented by a processor (201) running software (220) connected to memory (205), storage (210), and sound circuitry (230). Processor (201) executes instructions, thereby communicating data input from a driver, displaying information sent to the driver, and/or manipulating data. Although described as a single processor, multiple processors may be used according to particular needs. References to processor are meant to include multiple processors where applicable. Memory (205) and storage (210) may include any memory or database module and may take the form of volatile or non-volatile memory including, without limitation, magnetic media, optical media, random access memory (RAM), read-only memory (ROM), removable media, or any other suitable local or remote memory component. The sound circuitry (230) can be any circuit configured to link the processor (201) to the microphone and speaker (30).

Computer (15) implements user interface (50) via software (220). The software may be configured to only have capabilities related to the driver check-in. A minimized interface can be desirable to insure system security, reliability, and enhance the driver experience. In various embodiments the software (220) can include Windows 7™ with a bios configured to automatically power and reboot the user apparatus (10) in the event of a power failure. The software (220) can also include Microsoft Lync™ Instant Messenger™ and/or Net stop Kiosk™ to communicate with, secure, manage, and update the user apparatus. Status board software can also be implemented. In some variations, the status board may include a text area up to 4 lines by 120 characters and be executed via ColdFusion™.

Stand (40) supports user interface (50) and provides for ergonomic interaction with the components of the same. Stand (40) may be used to support computer (15), touch screen monitor (20), and/or microphone and speaker (30). In some embodiments the stand (40) can be a custom enclosure, while in others, the stand (40) may simply be a table or other suitable apparatus.

User apparatus (10) may be configured with various additional embodiments such as a card reader (37), a networking peripheral, a pager holder and/or distributor (35), camera (25), optical scanner and/or DOT reader. These features may be linked to user interface (50) via the computer (15) either directly via the computer's processor (201) or through a peripheral controller (250), e.g. serial or USB controller, depending on the nature of the given attachment.

Card reader (37) may be utilized to gather information regarding a driver of a delivery/pick-up vehicle. Card reader (37) may read cards such as payment cards or identity cards. Examples of card readers (37) include manual drag through card readers, motorized card readers, and insertion type push-pull card readers.

User apparatus (10) may include a networking peripheral (45) that connects user apparatus (10) to a remote apparatus, e.g. an administrator apparatus and/or a server. The network peripheral (45) may be wired, e.g., via CAT 5 cabling. In other embodiments a wireless network connection may be provided, e.g., Wi-Fi or cellular.

User apparatus (10) may include a pager holder that distributes pager(s) (35). Pagers (35) may also be distributed at another location such as an attendant at the driver facility. Pager (35) may be in communication with user apparatus (10), an administrator apparatus, administrative personnel, driver facility personnel, a loading/unloading facility and/or loading/unloading facility personnel. Pager (35) allows a driver to depart from the user apparatus, e.g. in excess of 1 mile, and still wirelessly receive notifications. Pager (35) may also be used to locate a driver. In some instances, pager (35) may be, specifically, in communication with the network peripheral (45) of the user apparatus (10). This configuration can permit a page to come from a distant location. Examples of commercially available pagers include Jtech Inteliflex™.

In some embodiments pager (35) is connected to computer (15); however, pager (35) may, instead, be connected to a second computer which is a further component of the user apparatus (10). The second computer can include a second network peripheral including, for example, a Hamachi™ VPN.

Camera (25) may also be included with user apparatus (10). Camera (25) may allow a driver to engage in video communications with a remote apparatus, e.g. an administrator apparatus. In various embodiments camera (25) can have a field of vision to capture an area adjacent to the driver while the driver is in its field of view. Camera (25) images may be used by software (220) for security, video logging, and facial recognition. Examples of cameras (25) include commercially available webcams, e.g. Logitech™ HD Webcam.

Printer (245) may be included with user apparatus (10). Printer (245) may print information as instructed by computer (15). Printer (245) may be, in various embodiments, a laser printer, label printer, or receipt printer. Software (220) can print information for the driver either a) via the user apparatus (10) or b) from a remote command received, for example, over the network peripheral by an administrator apparatus.

Figure 6:
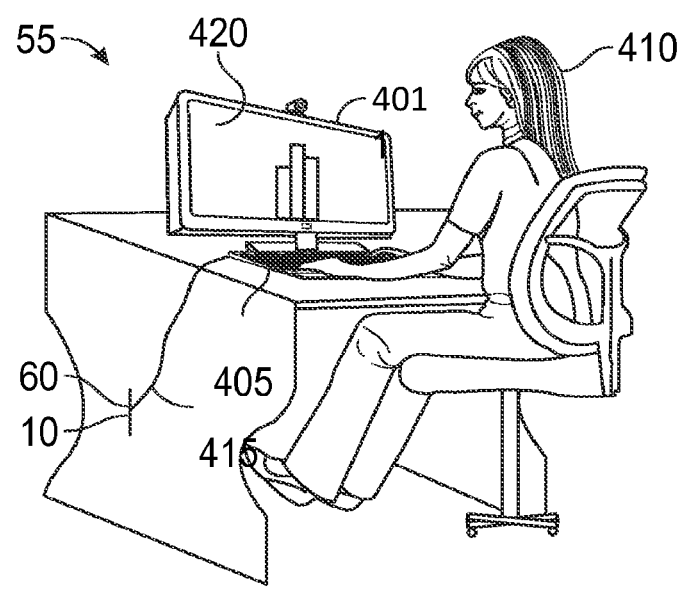
FIG. 6 shows an administrator apparatus, according to an exemplary embodiment of the present invention.

FIG. 6 shows an administrative apparatus (55) according to an exemplary embodiment of the present invention. Administrator apparatus (55) is shown with administrative personnel (410); however, some or all of it may be automated. Administrative apparatus (55) communicates with user apparatus (10) as well as the loading/unloading facility. Administrative apparatus (55) coordinates and controls the logistics of a delivery/pick-up. Implementation of administrator apparatus (55) may include a software driven computer (401) with video call functionality displaying an administrator interface (420), as well as, a keyboard for data entry (405) and a network connection (415). The administrator apparatus computer (401) may run a variety of software. In some embodiments the administrator apparatus computer (401) runs Microsoft Lync™ Instant Messenger Client™.

Figure 7:
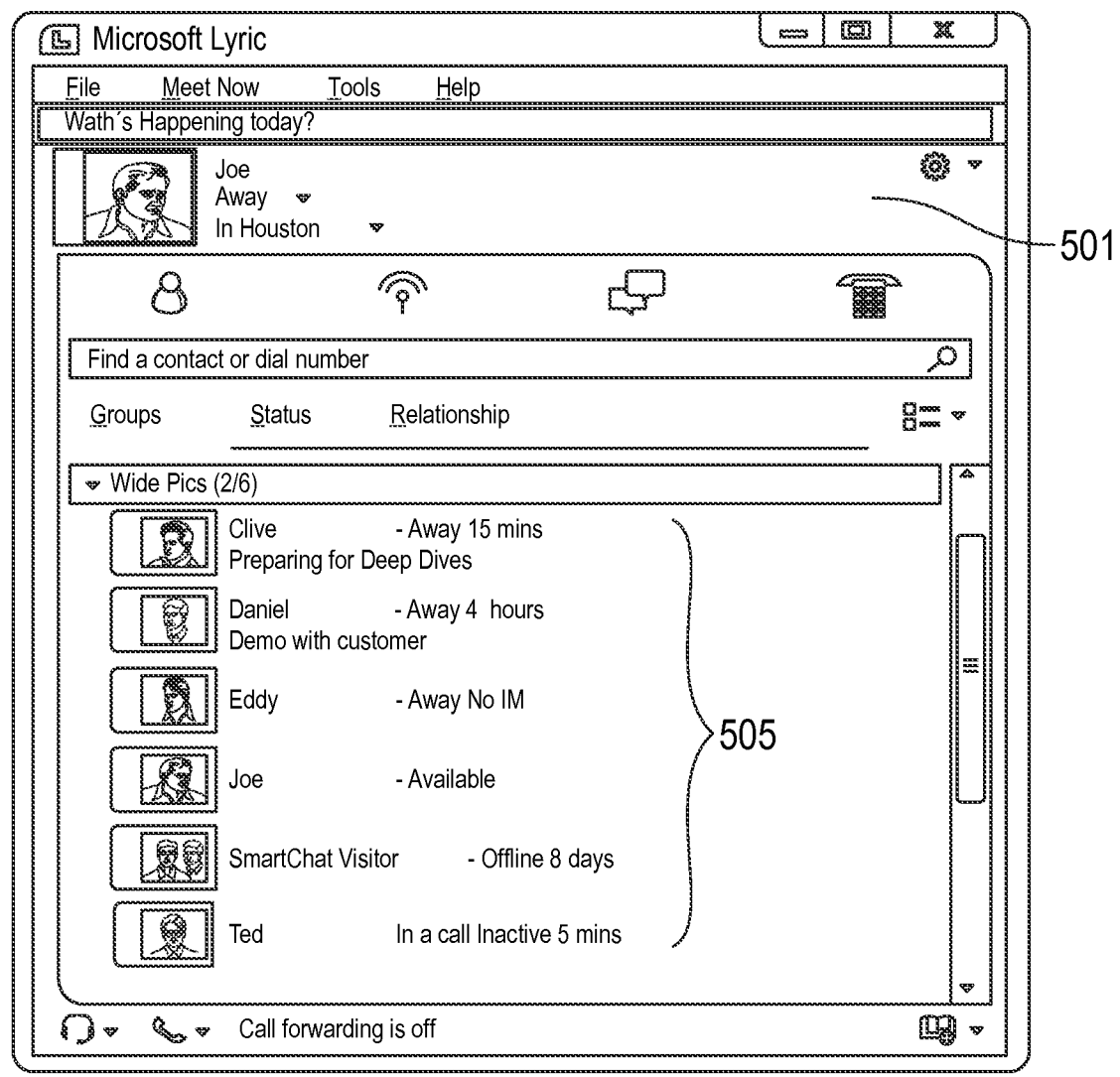
FIG. 7 shows a screen view of the administrator apparatus shown in FIG. 6.

When no call is incoming to administrator apparatus (55) a window (501) may be displayed on administrator apparatus (55), as shown in FIG. 7, showing the status of the administrator apparatus and available clients to initiate a call (505). The administrator apparatus can also, optionally, view camera (25) of user apparatus (10) to monitor the driver facility when no call is ongoing.

According to certain embodiments of the present invention, a driver approaches a user apparatus (10) and commences a video call with an administrator apparatus (55). When a call is initiated from user apparatus (10), a popup message plays a ringing sound and displays the name of the location that the call is coming from. The call may be displayed on multiple administrator apparatus. Once administrator (410) clicks "accept call" the call notification disappears and an administrator is connected to the driver located at a user interface (50). The driver and administrator (410) may communicate via camera, text and/or speakers. The administrator answers questions the driver has and enters in relevant information, e.g. truck and trailer number, driver identifying information, scale in/weight documentation, carrier safety certification, etc., into administrator apparatus (55). Information received at the user apparatus may be used to ensure the driver and/or load is authorized and provide an authorized driver release with relevant instructions. If there is a problem, e.g., improper load, improper load weight, revoked driver's license, etc. the driver can be flagged and automatically reported by the system to the appropriate authority. The information input is either stored in computer (405) or via the network connection to other system components such as the loading/unloading facility and/or computer (15) located at the user interface. In certain embodiments some or all of the information from a driver is gathered at user interface (50) and automatically sent to administrator apparatus (55) and the driver interfaces with the administrative computer system.

Administrative apparatus (55) and/or user apparatus (10) may be in communication with loading/unloading facility and query available docks. Sensors may be provided at each loading/unloading dock of loading/unloading facility and in communication with administrative apparatus (55) and/or user apparatus (10) as to availability. Alternatively, personnel at loading/unloading facility may be in communication with administrator apparatuses (55) and/or administrators (410). If an available dock is located, information is displayed to administrator (410) at administrator apparatus (55) and/or forwarded to the user apparatus (10). The administrator (410) may then, through the video connection or other communication devices, communicate with the user apparatus (10) and instruct the driver to proceed to the appropriate loading dock.

If an available loading dock cannot be located, the driver may be assigned by the administrative apparatus (55) and/or user apparatus (10) a pager. An appointment for the driver may then be scheduled by the system. Once an available loading dock is located, the assigned pager (35) is messaged, e.g. by the administrator or user apparatus. The driver may then initiate a new call at the user apparatus (10). Once connected to an administrator (410) the trucker is directed to the available dock. In additional exemplary embodiments the administrative apparatus (55) can display a queue at the user apparatus (10) and/or directly instruct the trucker to an available dock without the use of an administrator.

Figure 8:
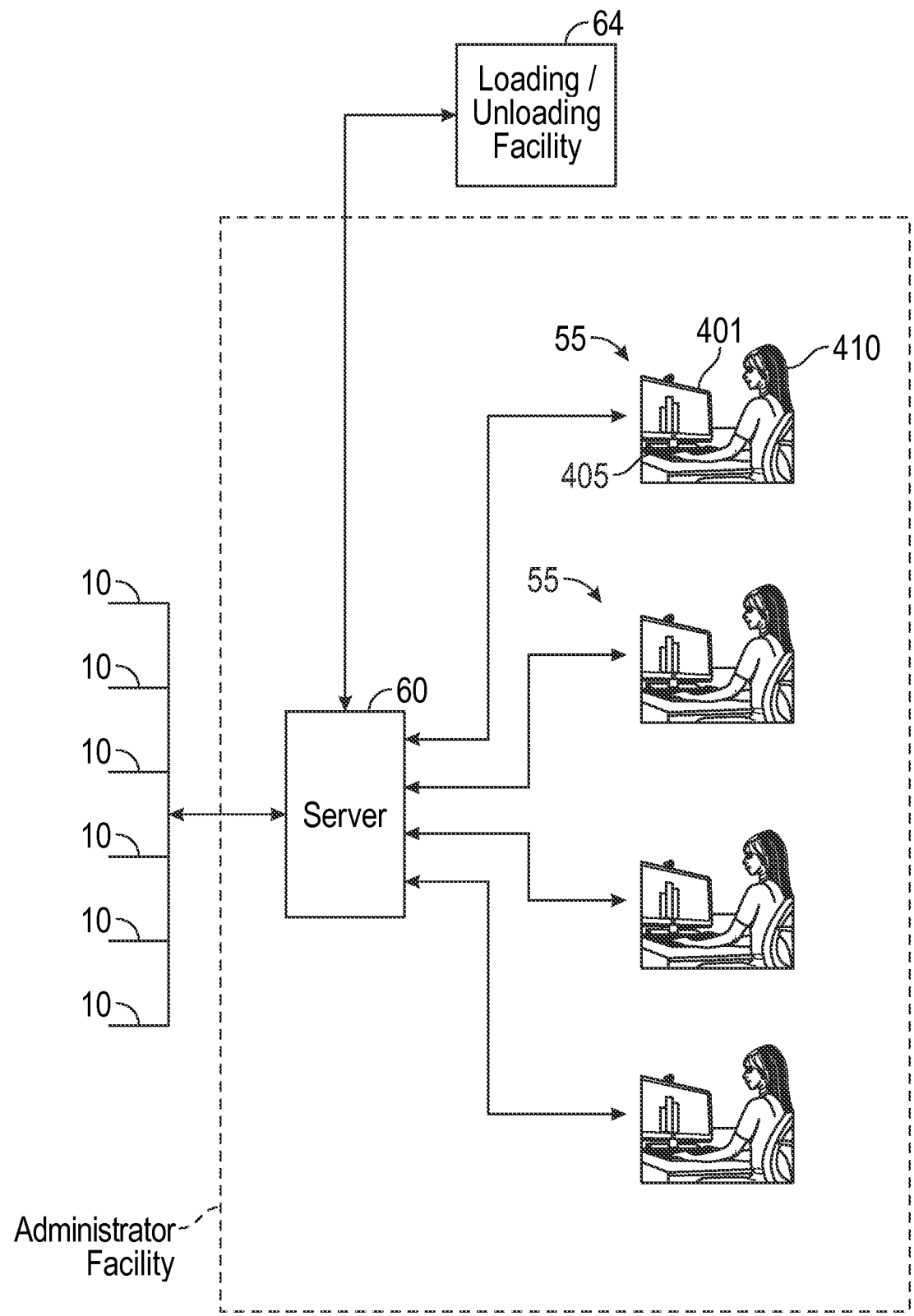
FIG. 8 is a schematic of multiple user apparatuses and multiple administrator apparatuses, according to an exemplary embodiment of the present invention.

Embodiments of the present invention provide for utilization of multiple user apparatuses (10) and/or multiple administrator apparatuses (55). As shown in FIG. 8, six user apparatuses (10) are connected to the Internet and communicate with server (60). Four administrator apparatuses (55) are connected to the Internet and in communication with server (60). Additionally loading unloading facility (64) is connected to the Internet and in communication with server (60). In embodiments of the present invention various suitable networks may be used.

Server (60) may be used to facilitate communications between user interfaces (50), administrator apparatuses (55), loading/unloading facility (64) and/or other component of the system as described herein. The use of a server can diminish the computing requirements of the user apparatus and administrative apparatus, e.g. allowing thin clients, while easing maintenance by consolidating elements. The server can be in various embodiments either a physical server, for example, an IBM M4 Tower™, or a server hosted through the internet, e.g. Amazon™ Web Services.

Server (60) may serve to further aid in the coordination of delivery/pick-up arrival at a loading/unloading facility by automating elements of the system. Examples of the interaction of server (60), user apparatuses (10), administrator apparatuses (55) and loading unloading facility (64) can be seen in FIG. 8.

Accordingly to an exemplary embodiment of the present invention, a driver is advised to check in at a user apparatus (10) located remotely from loading/unloading facility (64) at an off-site drivers lounge. The driver upon arrival touches the touch screen (20) of the user apparatus (10) and initiates a video call to the server (60). The server (60) rings multiple administrative apparatuses (55), and after an administrator (410) at an administrator apparatus (55) accepts the call, the server (60) connects the call and stops the ringing. The administrator (410) then inputs relevant information, such as trailer and truck number, into the server (60) using the administrator apparatus (55).

The server (60) is in communication with loading/unloading facility (64) and queries a driver database to attempt to locate an available dock. Sensors may be provided at each loading/unloading dock of loading/unloading facility (64) and in communication with server (60) as to availability. Alternatively, personnel at loading/unloading facility (64) may be in communication with server (60), administrator apparatuses (55) and/or administrators (410). If server (60) is communicated to and is able to locate an available dock, the available dock information is displayed to administrator (410) at administrator apparatus (55). The administrator (410) then through the video connection or other communication devices communicates with the user apparatus (10) and instructs the driver to proceed to the appropriate loading dock.

If the server (60) is unable to locate an available loading dock, the driver is assigned by the server (60) a pager from the user apparatus (10). Once the server (60) locates an available loading dock, the server (60) messages the assigned pager (35). The driver then initiates a new call at the user apparatus (10). Once connected to an administrator (410) the trucker is directed to the available dock. In additional exemplary embodiments the server (60) can display a queue at the user apparatus (10). Various embodiments described herein may be implemented without a server.

Figure 9:
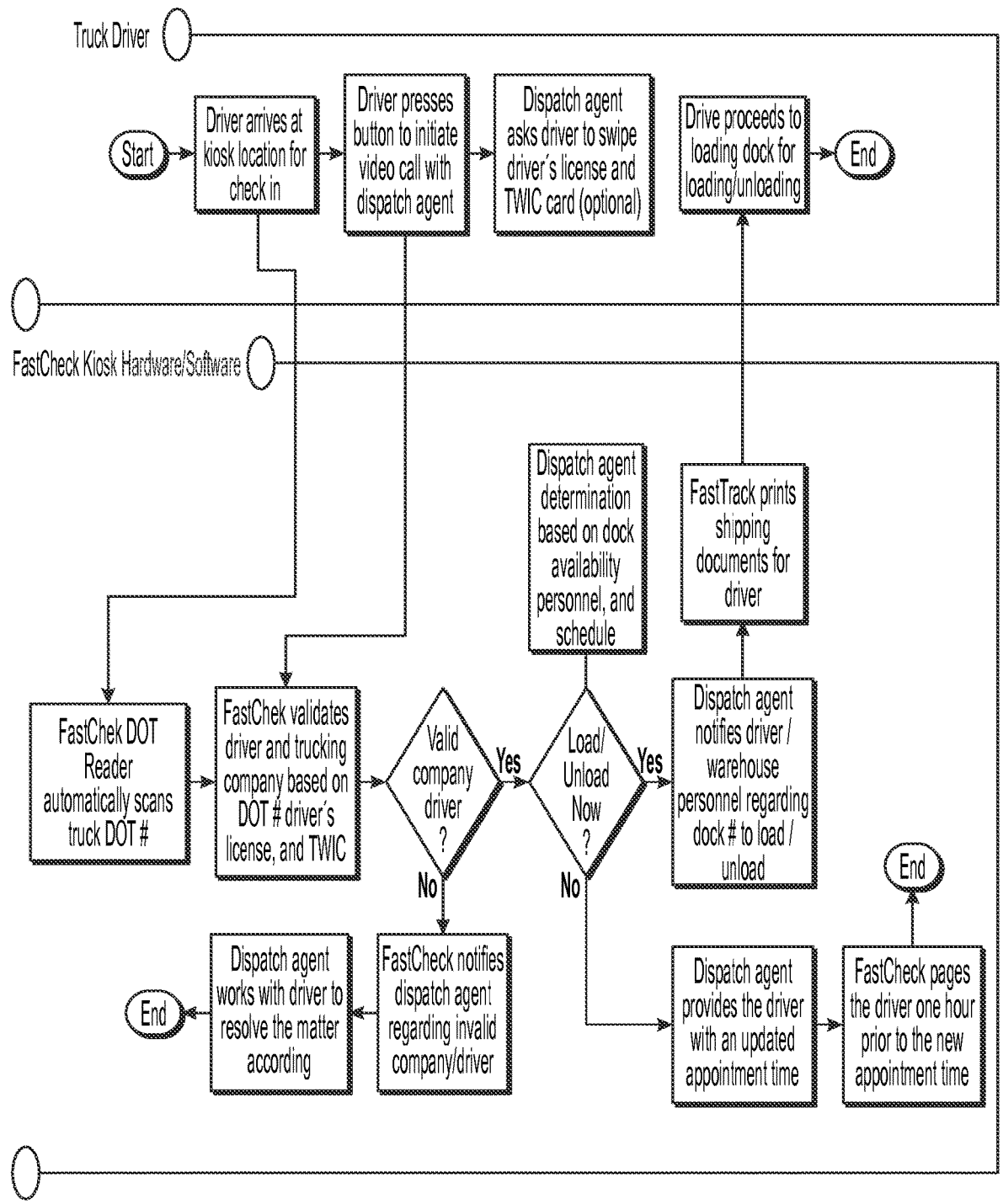
FIG. 9 is a flow chart showing a freight delivery/pick-up system using a dispatch agent, according to an exemplary embodiment of the present invention.
Figure 10:
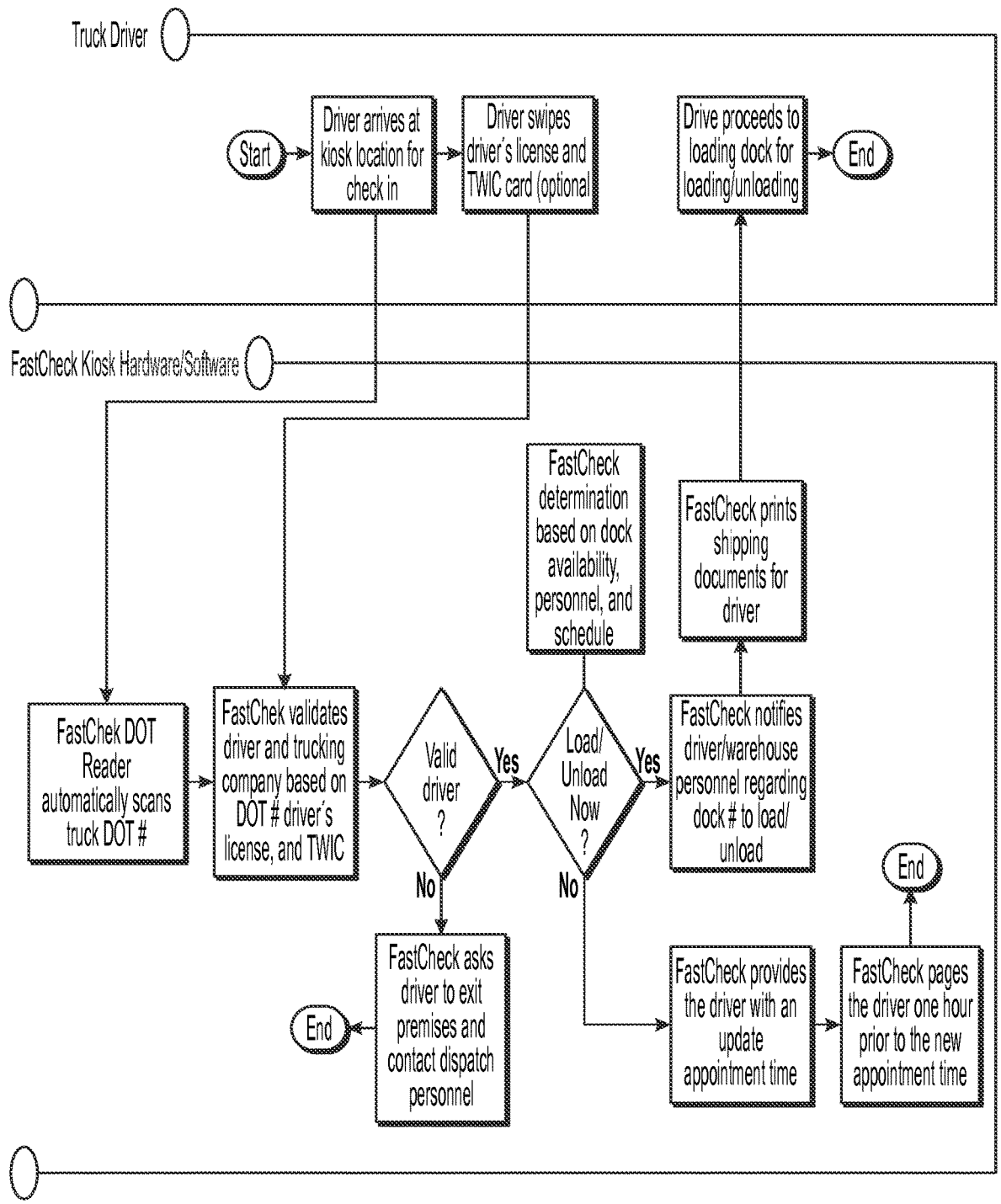
FIG. 10 is a flow chart showing an automated freight delivery/pick-up system, according to an exemplary embodiment of the present invention.

FIG. 9 shows a freight delivery/pick-up system using a dispatch agent, according to an exemplary embodiment of the present invention. FIG. 10 shows an automated freight delivery/pick-up system, according to an exemplary embodiment of the present invention. The systems described in FIGS. 9 and 10 may be implemented using the apparatuses, systems and methods described herein, including various embodiments thereof.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted. Support for the present invention, including example embodiments of the present invention, may be found in the attached documents and figures, all of which are expressly incorporated herein in their entirety by reference hereto.

What is claimed is:

1. A system comprising:
  a user apparatus including:
    a user interface configured to communicate with drivers of freight vehicles using a minimized interface configured to have capabilities related to driver check-in, wherein the user apparatus is fixed at a building or stationary kiosk that is separate from a loading/unloading facility; and
    one or more input and output devices that are configured to automatically receive driver and/or vehicle information, the input and output devices including:
      a Department of Transportation (DOT) reader configured to automatically read a DOT number of a driver's vehicle; and
      a card reader configured to automatically read a driver's license or TWIC card,
    wherein the user apparatus is configured to automatically perform driver and/or vehicle authorization based on the received driver and/or vehicle information obtained by the DOT reader and the card reader; and
  an administrator apparatus configured to automatically coordinate arrival of a plurality of vehicles at the loading/unloading facility to remove or mitigate bottlenecks associated with vehicles awaiting an opportunity to load or unload cargo by performing operations including:
    communicating with one or more sensors at the loading/unloading facility;
    automatically determining loading/unloading dock availability based on sensor input; and
    sending a message to the user interface communicating information including one or more of a check-in time, authorization information, driver identifying information, truck and trailer identifying information, scale in/weight documentation, and an authorized driver release.

2. The system of claim 1, wherein the user apparatus receives input information indicative of at least one of a check-in time, a pick-up/drop-off time, authorization information, driver identifying information, truck or trailer identifying information, or scale in/weight information.

3. The system of claim 1, wherein the administrator apparatus relays to the user apparatus at least one of an assigned loading dock, a loading dock current usage graphic, a pick-up/drop-off time, or an authorized driver release.

4. The system of claim 1, further comprising a logistics support facility in communication with at least one of the administrator apparatus, user apparatus, or loading/unloading facility.

5. The system of claim 1, further comprising a scale system that is in communication with at least one of the administrator apparatus, user apparatus, or loading/unloading facility.

6. The system of claim 1, wherein the user apparatus and the administrator apparatus each include camera systems that are in communication with one another.

7. The system of claim 1, wherein the user apparatus verifies driver security information and authorizes the driver for delivery at the loading/unloading facility.

8. The system of claim 1, wherein the administrator apparatus and user apparatus are located at a same facility.

9. The system of claim 1, wherein the administrator apparatus and user apparatus are located at different facilities.

10. The system of claim 1, wherein the administrator apparatus is located at the loading/unloading facility.

11. The system of claim 1, further comprising a pager system in communication with the driver and the administrator apparatus.

12. The system of claim 1, wherein the user apparatus includes at least one of a kiosk or a wall mounted display.

13. The system of claim 1, wherein the user apparatus further comprises an optical scanner.

14. The system of claim 1, further comprising an administrator system that interfaces with the administrator apparatus and the user apparatus and the loading/unloading facility and coordinates the arrival of a delivery/pick-up vehicle at the loading/unloading facility.

15. The system of claim 1, wherein the loading/unloading facility includes a sensor to detect the presence of a delivery/pick-up vehicle at a loading dock located at the loading/unloading facility, wherein the sensor is in communication with the administrator apparatus.

16. An apparatus comprising:
a user apparatus including at least one processor configured to execute instructions to communicate with drivers of freight delivery/pick-up vehicles and further configured to gather information regarding drivers and delivery schedules, the user apparatus further comprising:
a Department of Transportation (DOT) reader configured to automatically read a DOT number of a driver's vehicle,
wherein the user apparatus is configured to automatically perform driver and/or vehicle authorization based on received driver and/or vehicle information obtained by the DOT reader,
wherein the user apparatus is fixed at a building or stationary kiosk that is separate from a loading/unloading facility; and
an administrator apparatus that is configured to automatically coordinate arrival of a plurality of vehicles at the loading/unloading facility to remove or mitigate bottlenecks associated with vehicles awaiting an opportunity to load or unload cargo by performing operations including:
communicating with one or more sensors at the loading/unloading facility;
automatically determining loading/unloading dock availability based on sensor input; and
sending a message to the user interface communicating information including one or more of a check-in time, authorization information, driver identifying information, truck and trailer identifying information, scale in/weight documentation, and an authorized driver release.

17. The apparatus of claim 16, wherein the user apparatus receives input information indicative of at least one of a check-in time, a pick-up/drop-off time, authorization information, driver identifying information, truck or trailer identifying information or scale in/weight information.

18. The apparatus of claim 16, wherein the administrator apparatus relays to the user apparatus at least one of an assigned loading dock, a loading dock current usage graphic, a pick-up/drop-off time or an authorized driver release.

19. The apparatus of claim 16, further comprising a pager system including a pager in communication with the administrator apparatus.

20. The apparatus of claim 16, further comprising a camera system in communication with the administrator apparatus.

21. The apparatus of claim 16, further comprising an optical scanner.

22. The apparatus of claim 16, further comprising a card reader configured to identify a driver of the delivery/pick-up vehicle.

23. The apparatus of claim 16, wherein the user apparatus verifies driver security information and authorizes the driver for delivery at the loading/unloading facility.

24. A processor implemented method, comprising:
receiving, by a processor circuit of a user apparatus that is fixed at a building or stationary kiosk that is separate from a loading/unloading facility, driver information for a driver of a freight delivery/pick-up vehicle,
wherein the driver information is received by performing operations comprising:
controlling a DOT reader to automatically read a DOT number of a driver's vehicle; and
automatically performing driver and/or vehicle authorization based on received driver and/or vehicle information obtained by the DOT reader;
communicating the driver information to an administrator apparatus in communication with the loading/unloading facility;
communicating loading/unloading information from the loading/unloading facility to the administrator apparatus;
utilizing, by the administrator apparatus, the driver information and the loading/unloading information to automatically coordinate arrival of a plurality of vehicles at the loading/unloading facility to remove or mitigate bottlenecks associated with vehicles awaiting an opportunity to load or unload cargo by performing operations including:
communicating with one or more sensors at the loading/unloading facility;
automatically determining loading/unloading dock availability based on sensor input; and
sending a message to the user interface communicating information including one or more of a check-in time, authorization information, driver identifying information, truck and trailer identifying information, scale in/weight documentation, and an authorized driver release.

* * * * *